US006203828B1

United States Patent
Thota et al.

(10) Patent No.: US 6,203,828 B1
(45) Date of Patent: Mar. 20, 2001

(54) METHOD FOR FORMING A FILLED DOUGH PRODUCT

(75) Inventors: Hamsa A. P. Thota; Timothy A. Falken, both of St. Simons Island, GA (US)

(73) Assignee: Rich Seapak Corporation, St. Simons Island, GA (US)

( * ) Notice: Subject to any disclaimer, the term of this patent is extended or adjusted under 35 U.S.C. 154(b) by 0 days.

(21) Appl. No.: 09/453,814

(22) Filed: Dec. 3, 1999

(51) Int. Cl.[7] ........................................ A21D 6/00
(52) U.S. Cl. .................. 426/76; 426/94; 426/138; 426/275; 426/549; 426/496; 426/502; 426/503; 426/661
(58) Field of Search ................ 426/76, 94, 144, 426/138, 496, 502, 503, 275, 549, 661

(56) References Cited

U.S. PATENT DOCUMENTS

| 969,173 | * | 9/1910 | Loose | 426/76 |
|---|---|---|---|---|
| 1,174,826 | * | 3/1916 | Chapman | 426/76 |
| 1,646,921 | * | 10/1927 | Loose | 426/76 |
| 2,144,720 | * | 1/1939 | Gibson | 426/76 X |
| 2,147,098 | * | 2/1939 | Humphrey | 426/76 X |
| 4,032,664 | * | 6/1977 | Weiss et al. | 426/76 |
| 4,241,649 | | 12/1980 | Nelson et al. | 99/354 |
| 4,283,430 | | 8/1981 | Doster et al. | 426/284 |
| 4,661,361 | * | 4/1987 | Mongiello et al. | 426/94 X |
| 4,882,185 | | 11/1989 | Simelunas et al. | 426/283 |
| 5,045,329 | * | 9/1991 | Goglanian | 426/76 X |
| 5,750,170 | * | 5/1998 | Daouse et al. | 426/94 X |
| 5,756,137 | * | 5/1998 | Viviano et al. | 426/94 |

OTHER PUBLICATIONS

"Stuffed Crust Pizza Process", Research Disclosure, Jan. 1999, pp. 70–75.

* cited by examiner

Primary Examiner—Milton Cano
(74) Attorney, Agent, or Firm—Kenyon & Kenyon; Michael N. Haynes

(57) ABSTRACT

A filled dough product having a plurality of dough sticks is provided. The plurality of dough sticks of the filled dough product can be connected by a web of dough. Each dough stick from the plurality of dough sticks can be separable from the plurality of dough sticks along a break line in which liquid starch had been applied.

26 Claims, 4 Drawing Sheets

METHOD FOR FORMING A FILLED DOUGH PRODUCT

CROSS-REFERENCES TO RELATED APPLICATIONS

This invention relates to the following co-pending application Ser. No. 09/453,556, which is incorporated by reference:

"Apparatus and Method for Sealing a Filled Dough Product", filed concurrently herewith.

FIELD OF THE INVENTION

The present invention relates to filled dough products, and in particular, to an apparatus and method for forming a filled dough product.

BACKGROUND OF THE INVENTION

Filled dough products such as snacks, cookies, pies, filled cakes, and pizza pockets are increasing in popularity. Device and methods for forming filled dough products are known.

For example, U.S. Pat. No. 4,241,649 describes "an apparatus for making a filled tubular food product in which tubular dough piece are extruded onto a supporting die member which maintains the internal diameter ofthe cavity in the dough piece during raising and baking after which the cavity in the baked dough product is filled with another relatively softer food product."

U.S. Pat. No. 4,283,430 describes that a "tubular center filled food product having a rigid, friable, thermoplastic baked outer shell and a core of edible filling material is produced by a continuous, straight-through process. A semi-liquid batter having a relatively high content of mono- and/or di-saccharides is carried between a pair of spaced-apart moving heated surfaces and baked to form a continuous, elongated flat thermoplastic sheet having a controlled thickness. The continuous thermoplastic sheet while warm and pliable is rolled around its longitudinal axis to form a continuous tube having a closed longitudinal, non-overlapping seam. As the baked sheet is rolled around its longitudinal axis, an edible filling material is injected into the core of the continuous tube as it is formed. The filled tube is cooled until the outer shell becomes rigid and is then cut into pieces of a desired length."

The known devices and methods, however, are intended for use in creating individual filled dough products. To increase production rates, these known devices and methods can be employed in parallel production lines, however, each production line must form its own continuous dough sheet. Moreover, each resulting product must be individually handled for proofing, baking, freezing, and packaging purposes.

It is known to apply multiple continuous filling lines to a continuous sheet of dough, wrap the dough sheet over the filling lines, and crimp the dough sheet between the filling lines to form multiple structurally-connected, yet dough-surrounded filling lines. Once the continuous sheet of dough is cut into individual products, an attempt can be made to separate the resulting dough-surrounded filling segments along the crimp line into individual dough sticks. Separating the dough sticks along the crimp line, however, typically results in breaking of the dough surrounding the filling segment, thereby resulting in dough sticks of unacceptable quality.

Also, although it is known to terminate a filled dough product by cutting its end, such a practice leaves the filling at least partially exposed rather than completely covered with dough. Moreover, although it is known to crimp exposed ends of filled dough products, doing so causes a portion of the filling to be trapped within the crimp, causing a weaker crimp than if only dough material were crimped. Exposed ends and weak end crimps are subject to leakage or "blowout" of the filling when the filled dough product is heated or cooked. Such blowouts are unattractive, messy, and dangerous, as hot filling or steam can suddenly escape from the filled dough product, potentially burning the operator or consumer.

SUMMARY OF THE INVENTION

Embodiments of the present invention provide a filled dough product. The filled dough product can include a plurality of dough sticks connected by a web of dough, each dough stick from the plurality of dough sticks separable from the plurality of dough sticks along a starch line.

BRIEF DESCRIPTION OF THE DRAWINGS

The various features of the invention will best be appreciated by simultaneous reference to the description which follows and the accompanying drawings, in which.

DETAILED DESCRIPTION

Embodiments of the present invention provide a filled dough product. The filled dough product can include a plurality of dough sticks connected by a web of dough, each dough stick from the plurality of dough sticks separable from the plurality of dough sticks along a starch line.

As used herein, the term "break line" means a line along which a filled dough product is intended to be broken. The term "web" means a portion of dough joining two filled dough shells or capsules.

Applicants were faced with a need to increase production rates of their filled dough products in an economical manner. The known devices and methods did not teach or suggest an acceptable solution to this problem. One set of known devices and methods taught or suggested forming individual filled-dough products at a faster pace, Simply increasing the production rate, however, was uneconomical and ultimately, unworkable. Applicants hypothesized, however, that a single sheet of dough could be used to economically form high quality, filled-dough products by forming multiple products simultaneously. Applicants envisioned a single product formed to have multiple structurally-connected, yet separable, sticks, the separation of which would result in individual sticks having structurally sufficient dough capsules. Applicants realized however, that they must overcome the inferior quality of the products formed using the known devices and methods.

After much experimentation, applicants have discovered and developed a production system that facilitates, using a single sheet of dough, the formation of multiple, filled, dough products. Each of those products can have multiple structurally connected, yet separable sticks, which upon separation, result in individual sticks having structurally complete and substantially sturdy dough capsules. A more detailed description follows.

Figure 1:
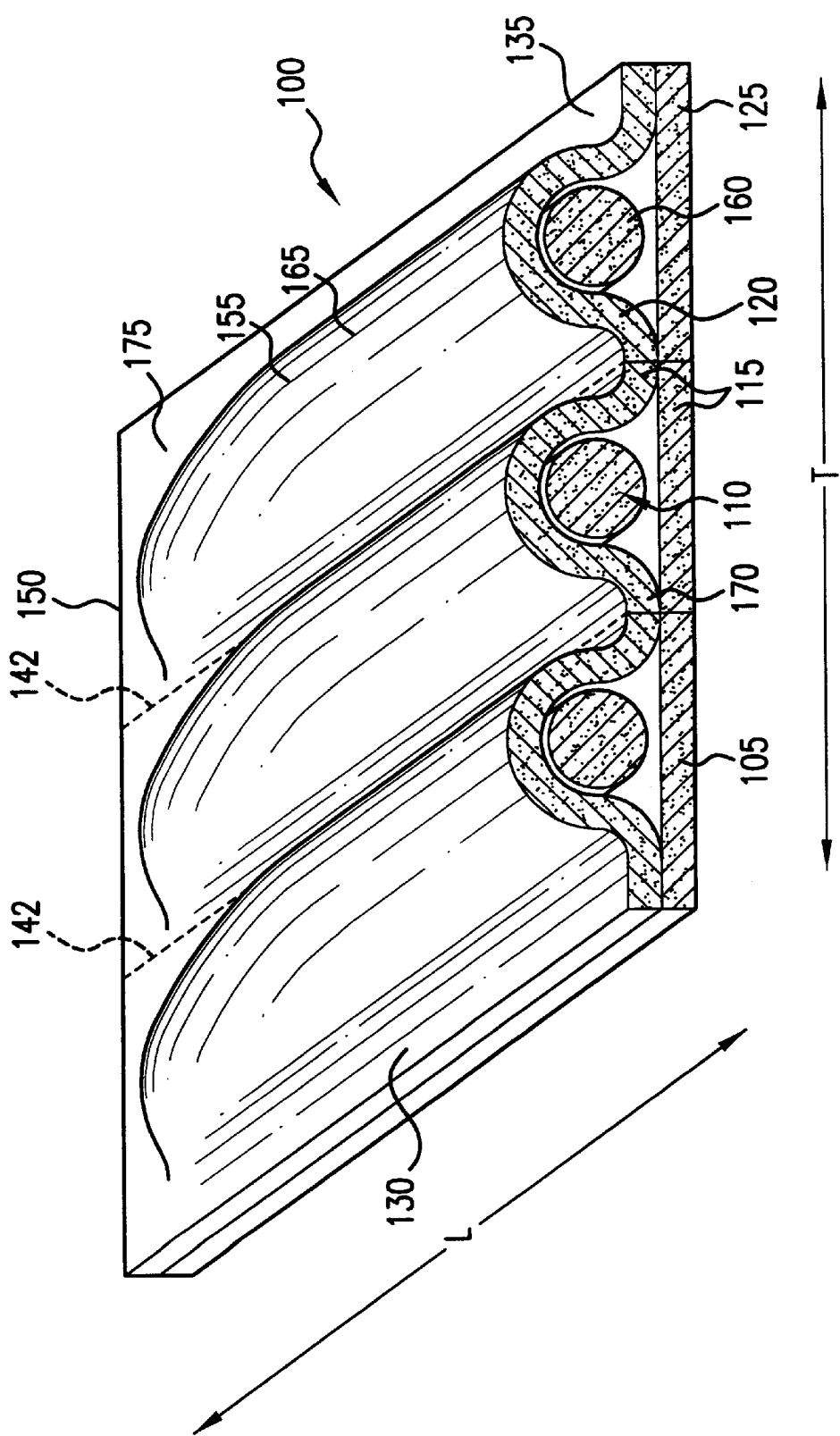
FIG. 1 is a cross-section of an embodiment of a filled dough product of the present invention.

FIG. 1 is a cross-section of an embodiment of a filled dough product 100 of the present invention showing longitudinal direction "L" and transverse direction "T". In this embodiment, a longitudinally-continuous sheet of dough 105 can have a width measured in the "T" direction. Multiple, continuous, filling lines 100 can be deposited longitudinally upon dough sheet 105, which can be folded over itself to reduce its width, to surround filling lines 110, and to form dough shell 115. Although shown as somewhat oblong in cross section, the cross-section of filling lines 110 can be any shape, including a circle, a regular polygon, an irregular polygon, or any closed curvilinear shape.

A top portion 120 of dough shell 115 can be crimped onto a bottom portion 125 of dough shell 115 between each filling line 110 and along a longitudinally-extending predetermined break line 142, thereby sealing dough shell 115 longitudinally between each filling line 110. Also, top portion 120 can be crimped along the longitudinal side portions 130 and 135 of product 100, thereby sealing dough shell 115 along side portions 130 and 135. Moreover, excess dough can be trimmed away from the side portions 130 and 135. Perforations can be applied along break line 142, which runs parallel to, and between, filling lines 110.

Filling lines 110 can be transversely severed to form filling segments 160. Dough shell 115 can be crimped and sealed at leading end 145 (shown in FIG. 3) and terminal end 150 of each product 100, to form dough capsules 155 encapsulating filling segments 160. Moreover, dough shell 115 can be separated transversely into multiple products 100, each having a leading end 145 and a terminal end 150.

Each product 100 can be configured as multiple filled dough sticks 165 that can include a filling segment 160 surrounded by a dough capsule 155. Each filled dough stick 165 can be connected to another filled dough stick 165 by a web of dough 170 that extends along and across break line 142. The dough web 170 can be perforated. The combination of structurally-connected, yet separable filled dough sticks 165 can form cluster 175.

In an illustrative example, filled dough product 100 can be configured as three dough capsules 155, each containing a mozzarella cheese filling segment 160, that can be web-connected to form three separable sticks 165. The outside of each stick 165 can measure approximately 5 inches long by 1.25 inches wide by 1 inch high. The web-connected sticks 165 can form a cluster 175 measuring approximately 5 inches long by 3.75 inches wide by 1 inch high. The weight of cluster 175 can be approximately 6 ounces. The dough web connecting sticks 165 can be broken along the predetermined break line, allowing sticks 165 to separate from one another cleanly, without damaging the dough capsule 155 of any stick.

Figure 2:
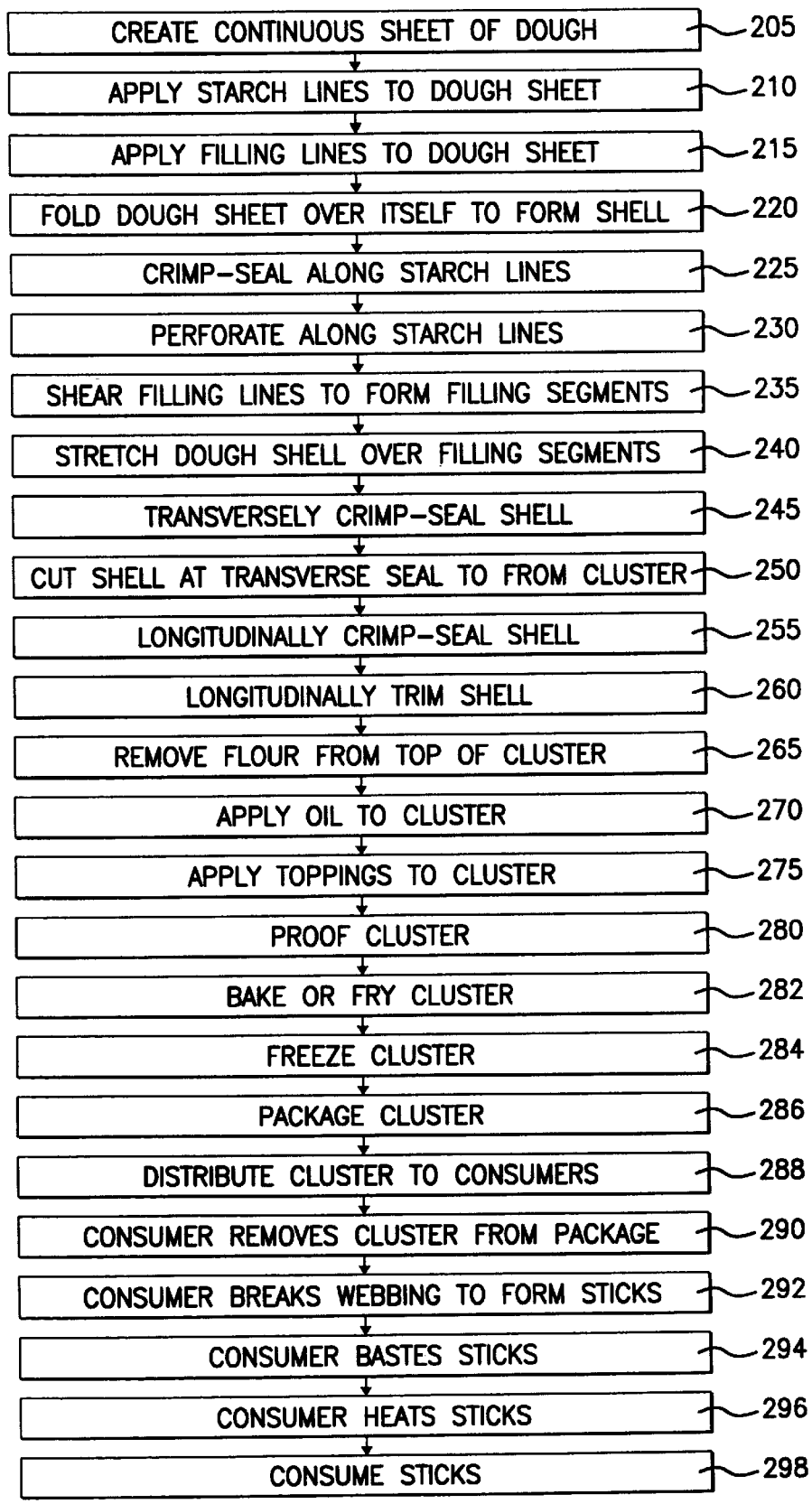
FIG. 2 is a simplified flowchart of an embodiment of a filled dough product production process of the present invention.

FIG. 2 is a simplified flowchart of an embodiment of a filled dough product production process 200 of the present invention. The arrangement of the blocks of the flowchart shown in FIG. 2 represent one possible sequence for the activities described therein, but should not be construed as limited to that particular sequence. Other sequences for these activities are possible and considered to be within the scope of the invention.

At block 205, a longitudinally continuous dough sheet can be created. The bottom of the dough sheet can be dusted with flour to prevent the dough sheet from sticking to a conveyor belt. At block 210, lines of starch can be longitudinally applied to the dough sheet to initiate break lines. At block 215, lines of filling can be longitudinally applied to the dough sheet on each side of each line of starch. At block 220, a part of the dough sheet can be folded over the lines of filling to form a dough shell. At block 225, the dough shell can be crimp-sealed along the lines of starch, furthering the creation of the break lines. At block 230, the dough shell can be perforated along the starch lines, again furthering the creation of the break lines.

At block 235, the filling lines can be sheared to form filling segments. At block 240, dough shell can be stretched over the filling segments to completely surround the filling segments with dough and define a transverse seal line. At block 245, the dough shell can be crimp-sealed along the transverse seal line. At block 250, the dough shell can be periodically cut along the transverse seal line, forming a cluster of filled, dough-encased sticks with each cut. At block 255, each cluster can be longitudinally sealed along its sides. At block 260, excess dough can be longitudinally trimmed from the sides of each cluster.

At block 265, flour can be removed from the top of each cluster. At block 270, oil can be applied to each cluster. At block 275, one or more toppings can be applied to each cluster. At block 280, each cluster can be proofed. At block 282, each cluster can be baked. At block 284, each cluster can be frozen. At block 286, each cluster can be packaged, either individually, or with other clusters. At block 288, the packaged clusters can be distributed to consumers.

At block 290, a consumer can remove a cluster from its packaging. At block 292, the consumer can cleanly break the dough webbing connecting one or more sticks to a cluster, thereby separating those sticks from the cluster. At block 294, the consumer can baste the sticks with a sauce. At block 296, the consumer can heat the sticks. At block 298, the sticks can be consumed.

Figure 3:
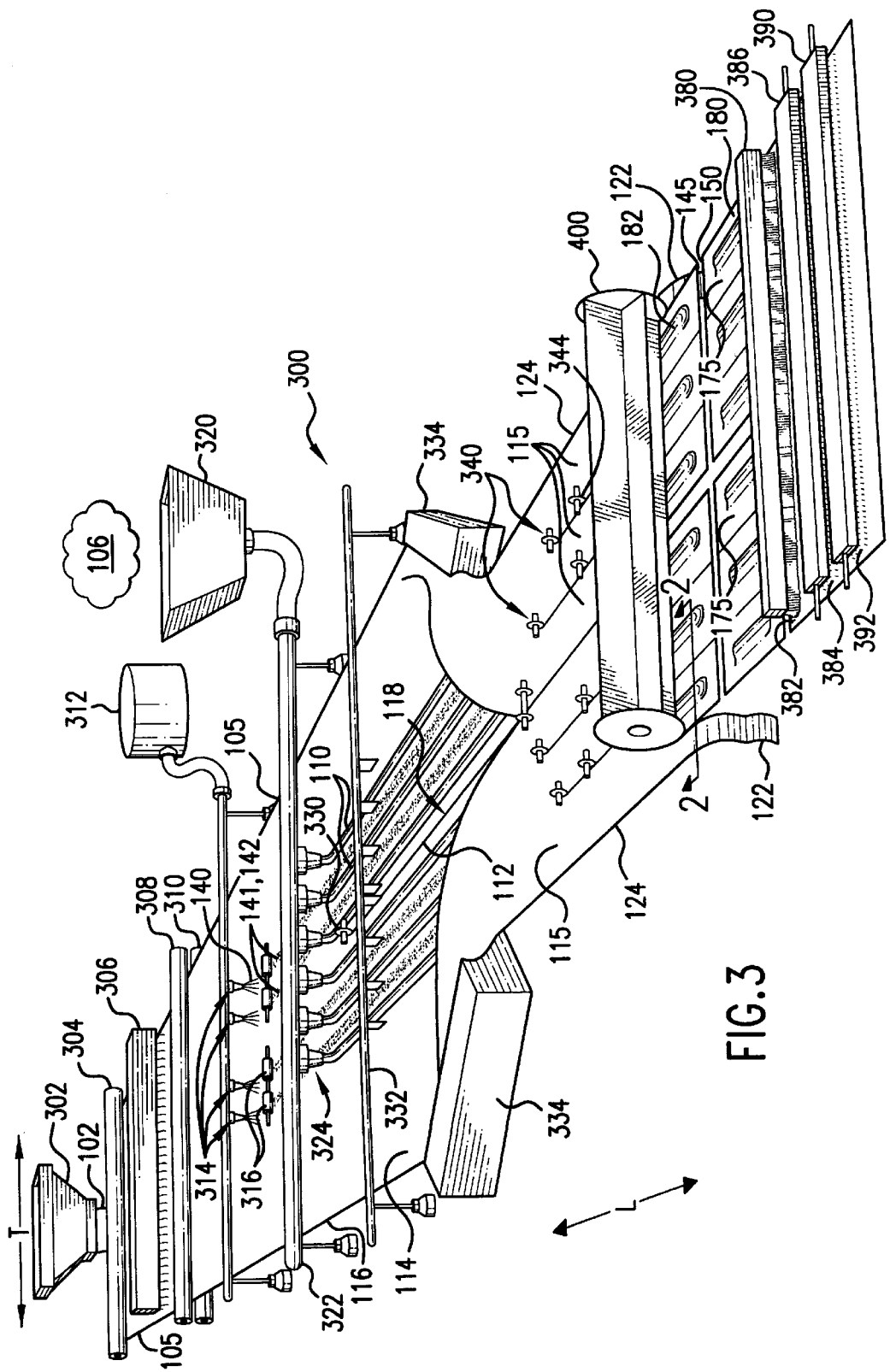
FIG. 3 is a perspective view of an embodiment of a filled dough product production system of the present invention.

FIG. 3 is a perspective view of an embodiment of a filled dough product production system 300 of the present invention. As shown in FIG. 3, filled dough product production system 300 can be a continuous production system, meaning that system 300 can be used to produce filled dough products in a continuous, uninterrupted fashion. In the shown embodiment, system 300 can be configured to simultaneously produce two dough products each having multiple filling segments. In alternative embodiments, however, system 300 can be configured to simultaneously produce more than two dough products each having multiple filling segments.

At a beginning of system 300, dough 102 can be formed from, for example, a standard pizza crust mixture, and transferred to dough hopper 302, which can provide dough 102 to a first roller 304, from which a dough sheet 105 can emerge. First roller 304 can cause dough sheet 105 to travel in a longitudinal direction "L" and have a width measured along a traverse direction "T". A flour duster 306 can dust flour onto dough sheet 105 as necessary to facilitate thinning of dough sheet 105 without breakage, to prevent the cracking of dough sheet 105, and/or to prevent the sticking of dough sheet 105 components of process 300. Additional rollers 308,310 can thin dough sheet 105 to a predetermined thickness and/or dough weight while expanding the width of dough sheet 105. Then, dough sheet 105 can be placed on a conveyor belt (not shown) to convey dough sheet 105 through additional processing.

It has been discovered that the application of lines 141 of liquid starch 140 at specific locations across the width of dough sheet 105 can facilitate, upon further processing of dough sheet 105 (e.g., crimping, perforating, and/or cooking), the formation of longitudinal break lines 142. These break lines 142 can allow a consumer to easily and reliably separate multiple structurally-joined sticks 165 (shown in FIG. 1) of a frozen, filled, dough product, the separation occurring without substantial damage to any of the sticks 165.

Thus, a liquid starch 140 can be provided from a starch supply system 312 to a plurality of spray nozzles 314 which can be positioned over predetermined locations across dough sheet 105 for application of liquid starch 140 thereto. Below each spray nozzle 314 can be a starch roller 316 which can spread the liquid starch 140 over a predetermined width of dough sheet 105. Because dough sheet 105 can be moving and the location of starch rollers 316 can be fixed, the application of liquid starch 140 can thereby define the location of starch lines 141 along dough sheet 105.

A filling 106 can be fed from filling supply system 320 to extruder 322. Filling 106 can be extruded from extruder 322 through extruder nozzles 324 positioned at predetermined locations over dough sheet 105 to form filling lines 110 along dough sheet 105. Filling lines 110 can be parallel to, and adjacent, break lines 142. Filling 106 can include a cheese, such as mozzarella cheese, cheddar cheese, and/or cream cheese. Filling 106 is not limited to cheese, however, and may be any extrudable substance. In an alternative embodiment, filling lines 110 can be formed using any well known method, including sprinkling, placing, pouring, distributing, or depositing filling 106. Moreover, each filling line 110 can be formed from a different filling. For instance, one filling line 110 can be mozzarella cheese, another filling line can be spiced or flavored cheese, and another filling line can be a meat and cheese combination.

As an illustrative example, prior to delivery to extruder 322, a filling 106 called a "cheese mash" can be formed using mozzarella cheese, flavorings, smoothing agents, and water. The mozzarella cheese used in mash 106 can be refrigerated below 40 degrees F but above freezing, and then shredded to achieve a cheese temperature of 40–42 degrees F. The mash ingredients can be blended to form a mash 106 having a blender exit temperature of 45 degrees F or less. Cheese mash 106 can be extruded onto dough sheet 105 such that cheese lines or "ropes" 110 can be separated by approximately 1.25 inches. The cheese weight per cluster 175 can be in the range of 2.7 to 2.9 ounces. The speed of extruder 322 can be adjusted to synchronize the speed of production of ropes 110 with the conveyed speed of dough sheet 105.

One or more dough dividers 330 can be positioned to cut and divide dough sheet 105 along one or more cut lines 112, thereby initiating the formation of multiple filled dough products from dough sheet 105. A straightener assembly 332 can keep filling lines 110 straight and aligned with respect to break lines 142. A plough 334 can fold a side portion 114 of divided dough sheet 105 completely over filling lines 110 until an outside edge 116 of side portion 114 contacts andjoins an inside cut edge 118 of dough sheet 105, thereby forming a dough shell 115 substantially surrounding filling lines 110. In an illustrative example, the ploughing can be performed such that the center to center distance between cheese ropes 110 can be maintained at 1.25 inches, and the total width of the cluster 175 can be maintained as 3.75 inches. The target weight of the dough for each cluster 100 can be about 3 to 3.5 ounces, and the target weight for each cluster 100 can be about 6 ounces.

Crimping wheels 340 can crimp, and thereby seal, a top portion of dough shell 115 to a bottom portion of dough shell 115 substantially along starch lines 141, and thereby between filling lines 110. To prevent crimping wheels 340 from sticking to dough shell 115, crimping wheels 340 can be constructed of a plastic, such as DELRIN. The earlier applied liquid starch 140, as well as a baking process later described, can assist in bonding top portion 120 to bottom portion 125 along starch lines 141.

It has been discovered that top portion 120 of dough shell 115 can experience excessive strain if multiple adjacent crimping wheels 340 are oriented such that their axes of rotation are coaxially aligned along direction "T". In such a situation, at any given moment, wheels 340 can simultaneously bear on a narrow transverse strip of top portion 120, and can cause excessively high stresses to arise in top portion 120, thereby causing tearing or excessive thinning of top portion 120. It has been further discovered that offsetting the axes of rotation of crimping wheels 340 along direction "L" can allow top portion 120 to recover from the stresses induced by one crimping wheel 340 before the compressive forces of another crimping wheel 340 can be applied to top portion 120. This offsetting can greatly reduce the transverse stresses imparted by crimping wheels 340 across top portion 120, thereby substantially preventing the tearing or excessive thinning previously experienced. In an illustrative embodiment, the axes of rotation of crimping wheels 340 can be separated by about 6 inches.

Perforating wheels 344, which can be substantially precisely aligned with crimping wheels 340, can perforate both top portion 120 and bottom portion 125 where connected along starch lines 141 (and thus break lines 142). In an illustrative example, each perforating wheel 344 can be aligned to within about 1/16 (0.0625) inch of the preceding crimping wheel, and can be constructed of stainless steel. Crimping wheels 340 and perforating wheels 344 can be adjusted to maintain a distance between break lines 142 of 1.25 inches. The perforation spacing can be selected from a range that can include 1/8 (0.125) inches to 3/4 (0.75) inches, such as, for example, 1/4 (0.25) inches.

A combination sealing/cutting assembly 400 can transversely crimp, and thereby seal, a top portion 120 (shown in FIG. 1) to a bottom portion 125 (shown in FIG. 1) of shell 115, to define a terminal end 150 of a first filled dough product 180 and a leading end 145 of a second filled dough product 182. Sealing/cutting assembly 400 can also separate first filled dough product 180 from second filled dough product 182. Furthermore, assembly 400 can trim excess dough 122 from an outside zone 124 of shell 115 to meet the dimensional specifications for clusters 175. Via the compressive forces applied in trimming excess dough 122, assembly 400 can seal top portion 120 to bottom portion 125 longitudinally along side portions 130 and 135. In an illustrative example, the sealing/cutting assembly can be adjusted to produce clusters 175 having a cheese weight of one ounce per stick 165, by adjusting the length of each cluster 175 to fall within the range of 4.75 inches to 5.25 inches.

A flour remover 380 can brush the top of each cluster 175 to remove loose flour 382 and thereby facilitate adhesion of oil 384 from oil bath 386. Next, a topping applicator 390 can apply a topping 392 to each cluster 175. Topping 392 can include Parmesan cheese, mozzarella cheese, spices, and/or other suitable toppings. In an illustrative example, a topping 392 that includes a mixture of shredded Parmesan and mozzarella cheese can be applied to the outside of clusters 175, such that the weight of each cluster 175 can be increased by 2 to 3 percent.

In preparation for packaging, clusters 175 can be proofed, baked, fried, and/or frozen using known techniques. In an illustrative example, clusters 175 can then be proofed for 6 minutes at 95 to 100 degrees F, followed by baking at 440 degrees F (+/−20 degrees) for 2.5 to 3 minutes. After processing, clusters 175 can be intact and uniform in size with less than one percent substantial shape deformities. Clusters 175 can be frozen in a mechanical continuous blast freezer having a blast setting of 55 minutes at −34 degrees F, and an exit temperature of 10 degree F. Afterwards, clusters 175 can be over-wrapped, packaged, and distributed to consumers.

Upon removal from a freezer by the consumer, clusters 175 can be broken along the predetermined break lines 142, such that sticks 165 (shown in FIG. 1) break apart cleanly along break lines 142, without either (a) tearing dough capsule 155 (shown in FIG. 1), (b) causing dough capsule 155 to separate from filling segment 160 (shown in FIG. 1), or (c) loosening the crimps that seal dough capsules 155. After separation, sticks 165 can be basted with a supplied sauce that has been thawed, for example, by heating in a microwave for 1 minute on High. Then, separated sticks 165 can be heated by the consumer at, for example, approximately 400 degrees F for 10–12 minutes without resulting in any release or "blowout" of filling segment 160 from dough capsules 155.

In an alternative embodiment for filled dough product production system 300, perforating wheels 344 can be replaced by cutting wheels (not shown), which can be substantially precisely aligned with crimping wheels 340, and can cut through both top portion 120 and bottom portion 125 where connected along starch lines 141. Via this simple modification, filled dough product production system 300 can be easily changed to form individual sticks 165 rather than clusters of sticks 175. This can be advantageous in institutional or commercial settings where it can be undesirable to break clusters to obtain individual sticks.

Figure 4:
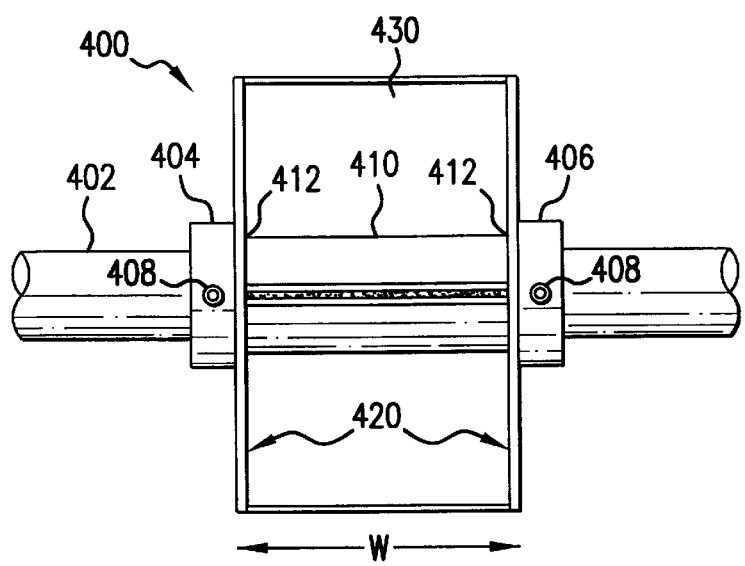
FIG. 4 is a side view of an embodiment of a sealing/cutting wheel assembly of the present invention.

FIG. 4 is a side view of an embodiment of a sealing/cutting assembly 400 of the present invention. Shaft 402, extending in the "T" direction, can be driven, either directly or indirectly, through a known transmission mechanism (not shown) such as a gearbox, coupling, belt, or chain. Sealing/cutting assembly 400 can include an inner collar 404 and an outer collar 406 that, via set screws 408, can couple sealing/cutting assembly to shaft 402. Sealing/cutting assembly can also include elongated cylindrical hub 410 that isolates product 100 from contact with shaft 402. A side blade 420 can be attached to each longitudinal end 412 of hub 410. Distributed circumferentially about, and attached to, hub 410 can be a plurality of transverse blades 430 which can span between side blades 420.

Side blades 420 serve to seal the longitudinal sides 115 (shown in FIG. 3) of product 100, and trim excess dough 122 (shown in FIG. 3) from sides 115. Transverse blades 430 serve to transversely seal the ends 145, 150 (shown in FIG. 3) of each product 100, and transversely separate connected products 100 into discrete products 100, such as, for example, a first product 180 (shown in FIG. 3) and a second product 182 (shown in FIG. 3).

In an illustrative example, shaft 402 can be 1.5 inches in diameter. Collars 404 and 406 can be 2.5 inches in outer diameter, and spaced 6.5 inches apart at their furthermost edges. Hub 410 can be 2 inch diameter stainless steel tubing. Side blades 420 can be formed from 11 gauge stainless steel, and can be spaced 4.75 inches apart.

Figure 5:
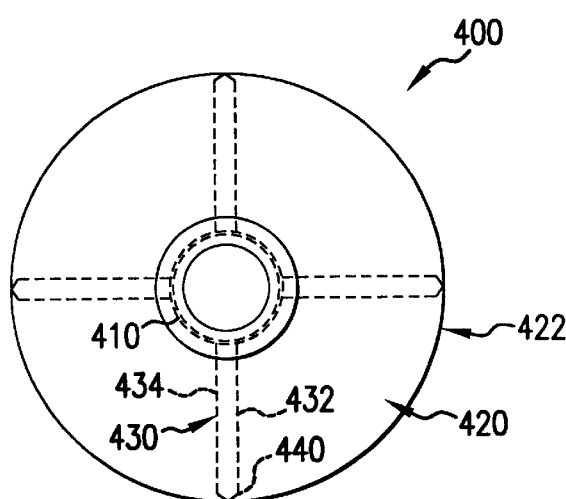
FIG. 5 is an end view of the embodiment of a sealing/cutting assembly 400 of the present invention shown in FIG. 4.

FIG. 5 is an end view of the embodiment of a sealing/cutting assembly 400 of the present invention shown in FIG. 4. Referring to FIG. 5, side blades 420 can be annular in shape, with an outer diameter equaling the outermost diameter swept by transverse blades 430. Side blade tips 422 can be located around the outermost circumference of side blades 420.

The circumferential spacing of transverse blades 430 on hub 410 can be based on a predetermined length of filled dough products 180 and 182 (shown in FIG. 1). Each of the plurality of transverse blades 430 can be located within planes that extend radially from hub 410. Moreover, each of transverse blades 430 can have a leading transverse blade face 432, a trailing transverse blade face 434, and a transverse blade tip 440.

In an illustrative example, four transverse blades 430 can be provided, each formed from ⅜ (0.375) inch stainless steel, and each measuring about 4.75 inches in length. The tips 440 of transverse blades 430 can define an outer diameter of about 7.5 inches.

Figure 6:
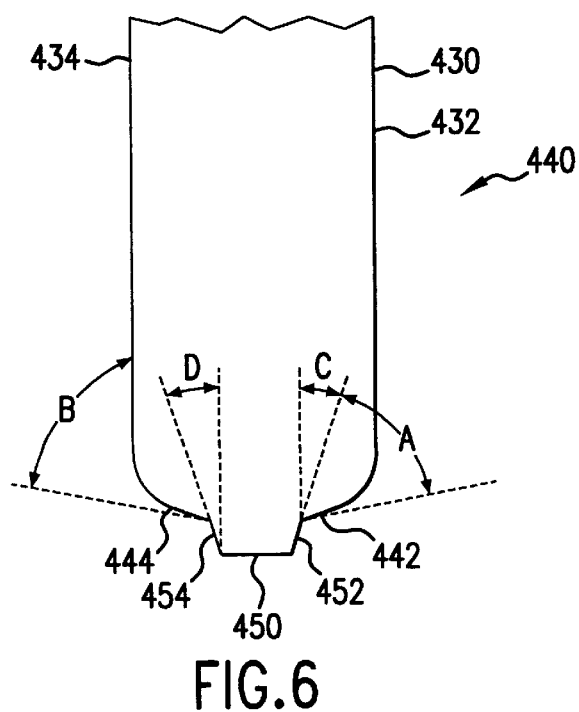
FIG. 6 is an end view of an embodiment of the transversely extending blade tips shown in FIG. 5.

FIG. 6 is an end view of an embodiment of the transversely extending blade tips 440 shown in FIG. 5. As described above, each of transverse blades 430 can have a leading transverse blade face 432, a trailing transverse blade face 434, and a transverse blade tip 440. At blade tips 440, there can be a leading transverse shoulder 442 and a trailing transverse shoulder 444. The angle between the plane containing leading transverse shoulder 442 and a plane parallel to the plane containing leading transverse blade face 432 is designated as angle "A". The angle between the plane containing trailing transverse shoulder 444 and a plane parallel to the plane containing trailing transverse blade face 434 can be designated as angle "B". Angle A and angle B can typically be selected from the range of 60 to 90 degrees.

Moreover, each of transverse blades 430 can have a transverse cutting edge 450 protruding from blade tip 440. Transverse cutting edge 450 can run the length of transverse blade 430, and can be centered between transverse shoulders 442 and 444. Each transverse cutting edge 450 can define a leading transverse cutting face 452 and a trailing transverse cutting face 454. The angle between the plane containing leading transverse cutting face 452 and a plane parallel to the plane containing leading transverse blade face 432 is designated "C", and can be selected from the range of 0 to 30 degrees. Similarly, the angle between the plane containing trailing transverse cutting face 454 and a plane parallel to the plane containing trailing transverse blade face 434 is designated "D", and can be selected from the range of 0 to 30 degrees. Transverse blade tip 440 and/or transverse cutting edge 450 can be heat-treated improve their wear-resistance.

In an illustrative example, each blade can be ⅜ (0.375) inches thick, and shoulders 442 and 444 can be defined by a 3/32 (0.09375) inch radius. Cutting edge 450 can be 0.120 inches thick, and 0.060 inches high. The transition from shoulders 442 and 444 to cutting edge 450 can be smoothed by a fillet having a radius of 0.015 inches. Angles A and B can be 80 degrees. Angles C and D can be 10 degrees.

In operation, as a dough shell passes beneath sealing/cutting assembly 400, blade tip 440 contacts the top portion of the dough shell, compressing the top portion against the filling lines, and thereby severing the filling lines into filling segments. Because the top portion can be more elastic than the filling lines, the top portion can be stretched over the newly formed ends of the filling segments. The stretching and compressing of the top portion continues until the top portion contacts and attaches to the bottom portion of the dough shell, thereby forming a transverse end seal. Almost immediately upon formation, the transverse end seal can be cut by cutting edge 450, thereby defining and separating a terminal end of a first filled dough product and a leading end of a second filled dough product. Nearly simultaneously, side blades 420 compress, seal, and trim dough along the sides of each product.

Embodiments of the present invention can offer many advantages over known devices and methods for forming filled dough products. For example, embodiments of the present invention can apply liquid starch to create predetermined break lines on a filled dough product. These breaks lines, optionally in combination with crimps and/or perforations aligned thereon, can allow a consumer to easily break and separate two structurally-connected sticks of the filled dough product from one another without substantial damage to either stick. Moreover, embodiments of the present invention can allow crimp lines to be formed between multiple structurally-connected sticks without over-stressing the dough shell forming any of those sticks. Furthermore, embodiments of the present invention can define and separate a terminal end of a first filled dough product and a leading end of a second filled dough product in such a manner that normal heating or cooking of either filled dough product will not result in a release or "blow-out" of the filling from the dough capsule of the product.

The disclosed embodiments are illustrative of the various ways in which the present invention may be practiced. Other embodiments can be implemented by those skilled in the art without departing from the spirit and scope of the present invention.

For example, the function of the intermediate crimping wheels can be combined with the function of the perforating wheels.

What is claimed is:

1. A method for forming filled dough products, comprising the steps of:

forming a sheet of dough;

placing a plurality of break lines on said sheet of dough;

aligning a liquid starch dispenser with said plurality of break lines;

applying liquid starch along the break lines;

feeding parallel lines of filling material adjacent said break lines;

folding a side portion of the sheet of dough over the filling lines to form a dough shell surrounding the filling lines;

perforating the dough shell along the break line; and enclosing the lines of filling within the dough shell, to thereby form filled dough products.

2. The method of claim 1, further comprising:

crimping a dough shell formed from the sheet of dough along a break line.

3. The method of claim 1, further comprising:

rolling a plurality of crimping wheels along a break line on a dough shell formed from the sheet of dough.

4. The method of claim 1, further comprising:

rolling a plurality of crimping wheels along a break line on a dough shell formed from the sheet of dough, each crimping wheel from said plurality of crimping wheel having an axis of rotation that is parallel to and offset from an axis of rotation of each of the remaining crimping wheels from said plurality of crimping wheels.

5. The method of claim 1, further comprising:

shearing a line of filling within a dough shell formed from the sheet of dough to form segments of filling.

6. The method of claim 1, further comprising:

stretching a dough shell formed from the sheet of dough over an end of a segment of filling.

7. The method of claim 1, further comprising:

crimping a dough shell formed from the sheet of dough over an end of a segment of filling.

8. The method of claim 1, further comprising:

encapsulating a line of filling within a dough shell formed from the sheet of dough.

9. The method of claim 1, further comprising:

simultaneously sealing a trailing end of a first product formed from the sheet of dough and a leading end of a second product formed from the sheet of dough.

10. The method of claim 1, further comprising:

separating a trailing end of a first product from a leading end of a second product.

11. The method of claim 1, further comprising:

separating a dough shell formed from the sheet of dough to define a trailing end of a first product and a leading end of a second product.

12. A method of forming a break line during the making of a filled dough product, comprising the steps of:

providing a sheet of dough;

placing at least one break line on said sheet of dough;

aligning a liquid starch dispenser with said at least one break line; and applying liquid starch along said at least one break line.

13. The method of claim 12, further comprising:

placing parallel lines of filling on the sheet of dough.

14. The method of claim 12, further comprising:

folding a side portion of the sheet of dough over the filling to form a dough shell surrounding the filling.

15. The method of claim 12, further comprising:

crimping a dough shell formed from the sheet of dough along said at least one break line.

16. The method of claim 12, further comprising:

rolling a crimping wheel along said at least one break line.

17. The method of claim 12, further comprising:

rolling a plurality of crimping wheels along a break line on a dough shell formed from the sheet of dough, each crimping wheel from said plurality of crimping wheel having an axis of rotation that is parallel to and offset from an axis of rotation of each of the remaining crimping wheels from said plurality of crimping wheels.

18. The method of claim 12, further comprising:

perforating a dough shell formed from the sheet of dough along said at least one break line.

19. The method of claim 12, further comprising:

shearing a line of filling within a dough shell formed from the sheet of dough to form segments of filling.

20. The method of claim 12, further comprising:

stretching a dough shell formed from the sheet of dough over an end of a segment of filling.

21. The method of claim 12, further comprising:

crimping a dough shell formed from the sheet of dough over an end of a segment of filling.

22. The method of claim 12, further comprising:

enclosing a line of filling within a dough shell formed from the sheet of dough.

23. The method of claim 12, further comprising:

encapsulating a line of filling within a dough shell formed from the sheet of dough.

24. The method of claim 12, further comprising:

simultaneously sealing a trailing end of a first product formed from the sheet of dough and a leading end of a second product formed from the sheet of dough.

25. The method of claim 12, further comprising:

separating a trailing end of a first product from a leading end of a second product.

26. The method of claim 12, further comprising:

separating a dough shell formed from the sheet of dough to define a trailing end of a first product and a leading end of a second product.

* * * * *